United States Patent [19]

Quinquis et al.

[11] 4,434,463
[45] Feb. 28, 1984

[54] MULTIPROCESSOR TOPOLOGY WITH PLURAL BASES FOR DIRECTLY AND INDIRECTLY COUPLING ADDRESSES AND RELAY STATIONS

[76] Inventors: Jean-Paul Quinquis, rue de Cornic, Perros Guirec, France, 22700; Michel A. Devault, 22, rue de Bourgogne, Lannion, France, 22300

[21] Appl. No.: 210,819

[22] Filed: Nov. 26, 1980

[30] Foreign Application Priority Data

Nov. 30, 1979 [FR] France ............................ PV 7929571

[51] Int. Cl.³ .............................................. G06F 15/16
[52] U.S. Cl. ...................................... 364/200; 370/85; 370/88; 370/60; 375/107; 340/825; 340/825.02; 340/825.18
[58] Field of Search .............................. 364/200, 900; 370/86-88, 85, 92, 60; 375/106, 107; 340/825, 825.01-825.05, 825.18, 825.21

[56] References Cited

U.S. PATENT DOCUMENTS

| Re. 31,182 | 3/1983 | Crager et al. | 178/3 |
|---|---|---|---|
| 4,124,776 | 11/1978 | Nocker | 370/87 |
| 4,142,069 | 2/1979 | Stover | 179/15 BS |
| 4,195,351 | 3/1980 | Barner et al. | 364/900 |
| 4,205,326 | 5/1980 | Porter et al. | 340/147 R |
| 4,287,592 | 9/1981 | Paulish et al. | 370/88 |
| 4,347,498 | 8/1982 | Lee et al. | 340/825.02 |
| 4,354,225 | 10/1982 | Frieder et al. | 364/200 |
| 4,383,314 | 5/1983 | TAM | 370/86 |
| 4,399,531 | 8/1983 | Grande et al. | 370/60 |

FOREIGN PATENT DOCUMENTS

| 2049366 | 12/1980 | United Kingdom | 370/60 |
|---|---|---|---|
| 2054324 | 2/1981 | United Kingdom | 370/88 |

OTHER PUBLICATIONS

R. P. Lee, *Dynamically Reconfigurable Logic Ring Network*, IBM Tech. Disclos. Bull, vol. 21 No. 8 (Jan. 1979).

George Anderson & Douglas Jensen: "Computer Interconnection Structures: Taxonomy, Characteristics and Examples", Computing Surveys, vol. 7, no. 4, Dec. 1975, pp. 197-213.

*Primary Examiner*—James D. Thomas
*Assistant Examiner*—Archie E. Williams
*Attorney, Agent, or Firm*—Lowe, King, Price & Becker

[57] ABSTRACT

A multiprocessor system for processing digital data includes a plurality of P buses and a plurality of at most P(P−1)/2 processor stations. Each station is connected to a pair of buses. The pair of buses to which a station is connected is different for each station. Each station is directly connected to 2(P−2) stations, and indirectly connected through a single relay station to at most (P−2)(P−3)/2 stations. The buses have addresses 1 to P and each station is given one complete address formed by the concatenation in any order of the addresses of the two buses to which it is connected and two incomplete addresses formed by the address of any of the two buses to which it is connected. When detecting its complete address, a station behaves as an addressee station and when detecting one of its two incomplete addresses, a station behaves as a relay station.

6 Claims, 15 Drawing Figures

MULTIPROCESSOR TOPOLOGY WITH PLURAL BASES FOR DIRECTLY AND INDIRECTLY COUPLING ADDRESSES AND RELAY STATIONS

BACKGROUND OF THE INVENTION

1. Field of the Invention

The present invention relates to electronic multiprocessor systems for processing digital and logical data—i.e., systems comprising a number of data-processing stations linked by a number of buses to exchange messages containing e.g., data, instructions, requests and so on. Multiprocessor systems of this kind are of use inter alia for controlling automatic telephone or visiophone exchange equipment, data-collecting and processing networks, automated installations for controlling the various phases of an industrial process and the switching of messages in voice mode or packet mode.

As a rule, each station comprises a processor and means for coupling the station with at least one bus link. Advantageously, the system is arranged not to use common elements, such as central control unit or central store or the like, so that for a slight complication of the stations, there are fewer restrictions on design and there is an appreciable reduction in the risks of total outage of the system. The interconnection bus network contains all the internal links of the system.

2. Description of the Prior Art

Multiprocessor systems of this kind which do not use a common element have already been described and general architecture schemes are proposed, for instance, in the article by George A. Anderson and E. Douglas Jensen entitled "Computer Interconnection Structures: Taxonomy, Characteristics and Examples" and published in the American Journal "Computing Surveys", Volume 7, No. 4, December 1975, pages 197 to 212.

As seen hereinafter, the known systems can be broken down into three kinds—a first kind, in which all stations are interconnected by a single bus carrying all traffic, a second kind, in which the system forms a linear chain in which stations and buses alternate, and a third kind, in which each station is connected to each of the other stations of the system by its own bus.

As a general rule, for a system having a given number of stations, system reliability and traffic speed increase with the number of buses used, but increasing the number of buses increases the complexity of the bus controllers and the overall cost of the system.

SUMMARY OF THE INVENTION

The invention relates to a multiprocessor system which, as will be seen, has all the advantages of the known systems but is substantially free from the disadvantages thereof.

In the system in accordance with the invention, and in systems of the second kind hereinafter referred to, each station having an address comprises:

means for coupling each processor station of the multiprocessor system with just two buses;

means for delivering to at least one of the buses a message comprising the address of an addressee station;

means in each processor station for identifying its own address in messages reaching it via either of the two buses connected thereto and for routing the corresponding messages to its data-processing means;

means for identifying, in messages reaching it via either of the two buses, the address of an addressee station connected to the other bus and for relaying such message and such address to the other bus.

In the system in accordance with the invention, the number of buses is such, and the connections between buses and stations are so arranged that two stations are never connected to the same pair of buses and whatever the buses to which any first station and any second station are connected, there are always at least two other stations, each connected to the same bus as the first station and to the same bus as the second station.

The following description discloses embodiments in accordance with the invention of a multiprocessor system including a large number of stations requiring only a reduced number of buses. A single relay station is sufficient to enable two stations not connected to the same bus to communicate indirectly. Any two stations not connected to the same bus have a choice to communicate indirectly between at least two and at most four relay stations, with a consequent very appreciable reduction in average waiting times, for traffic between any two such stations. For a given number of buses the number of stations which can act as relay stations increases with the number of stations in the system.

As will also become apparent, since two stations cannot be connected to the same pair of buses, each station of the system can be identified by an address resulting from the combination (concatenation) of addresses assigned to the two buses to which such station is connected, so that messages can be routed by means of logical and digital circuits which are very simple and therefore inexpensive and reliable despite the wide variety of possible routes.

BRIEF DESCRIPTION OF THE DRAWINGS

Other features of the invention and advantages they provide will become apparent from the following description of examples of prior art systems and of the system in accordance with the invention, reference being made to the accompanying drawings wherein:

FIG. 2 is an interconnection bus chart for a system of the first prior art kind hereinbefore referred to;

DESCRIPTION OF THE PREFERRED EMBODIMENTS

In the first form of representation the interconnection charts are of polygonal shape, in the second form of representation, the buses are depicted in the form of parallel segments and in the third form of representation, the bus-representing segments are bent at right-angles so that each bus meets all the others. However, all these forms of representation are equivalent, their function being to highlight particular characteristics of the bus network shown.

Figure 1:
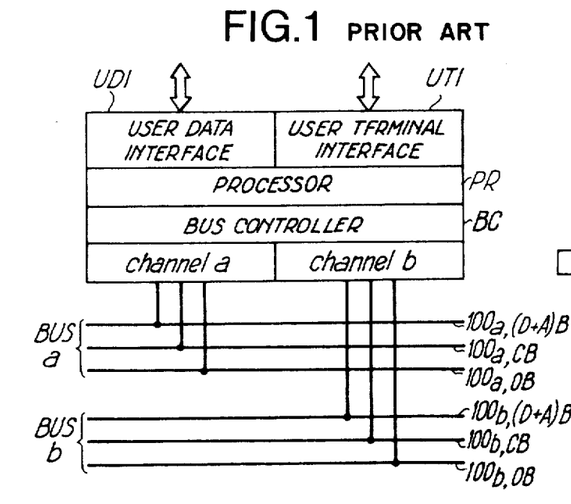
FIG. 1 is a block diagram showing the general arrangement of a processor station as used both in prior art systems and in the system in accordance with the invention.

Referring first to FIG. 1, both in prior art multiprocessor systems and in a system in accordance with the invention, each station comprises a processor PR connected to a user data interface UDI and to a user terminal interface UTI and to one or more buses BU by a bus controller BC having input-output channels equal in number to the same number as there are buses.

By way of one or more physical bus links each bus provides the following operational links:

Information link $100_{a,(D+A)B}$ and $100_{b,(D+A)B}$, providing series transmission of information signals (address, message contents) transmitted by a transmitting station for an addressee station;

A clock link $100_{a,CB}$ and $100_{b,CB}$ conveying a clock signal (output by the transmitting station if the transmission is a synchronous transmission);

A busy link $100_{a,OB}$ and $100_{b,OB}$ whose electrical state indicates whether the information link is free or busy; and A conflict arbiter link which can be the same as the information link $100_{a,(D+A)B}$ and $100_{b,(D+A)B}$.

The links $100_{a,OB}$ or $100_{b,OB}$ and the links $100_{a,(D+A)B}$ or $100_{b,(D+A)B}$ are control or check links ensuring that the information link is seized by just a single station. In the bus controller BC of each station desiring to seize an information link, a conflict arbiter or allocator assigned to each channel tests the state of the information link on the busy link of the corresponding bus, then outputs to the conflict arbiter link (which can extend by way of the information link) a logic signal expressing the value of a logic function combining the addresses of stations wishing to seize the information link or order to give priority to one of them.

Figure 2:
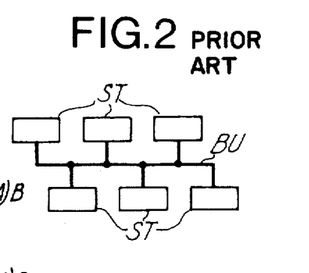

In the system shown in FIG. 2 of the first prior art kind, all the links between all the stations of the system are provided by a single bus BU. This system has the merit of simplicity (a single channel and a single allocator in each bus controller, a single bus) but suffers from serious disadvantages: failure of the bus affects all the stations of the system, the rate of traffic flow at any time is limited just to a dialogue between two stations, and the number of stations cannot exceed a limit determined by the length of the bus link and by the transmission frequency.

Theoretically, the first two disadvantages can be obviated by increasing the number of buses BU, but in this event, the bus controller in each station must comprise the same number of channels as there are buses in the system and the advantage of simplicity is completely lost.

The number of stations can be increased by introducing regeneration amplifiers in each bus; however, the amplifiers are common elements which affect system reliability, outage of any one amplifier affecting the whole of a bus.

Figure 3:
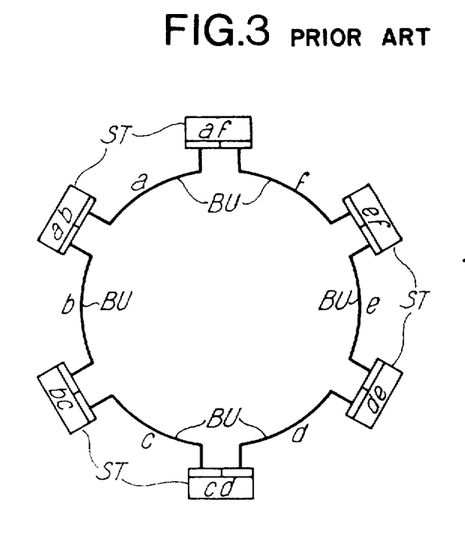
FIG. 3 is an interconnection bus chart for a system of the second prior art kind hereinbefore referred to, in the form of representation, called the first form of representation, used for FIG. 2.

In the system shown in FIG. 3 and corresponding to the second prior art kind of distributed multiprocessor systems, there are as many buses BU as there are stations ST and these bus sections are arranged in a common bus loop configuration with the common bus interconnecting the attached stations. Topologically, the stations are at the apices of a polygon whose sides are the bus sections. If the bus sections are given addresses a, b, c . . . f and the stations are given addresses resulting from the combination—i.e., the concatenation—of the addresses of the two bus sections to which each station is connected, namely ab or ba, bc or cb, . . . fa or af, and if it is assumed that signals can travel along the common bus in either direction, a message, for instance, from station ab for station cd must be routed either through station bc or through stations ef, af and de. In other words, there is indirect communication between the two non-adjacent stations ab and cd, as compared with the direct communication between two adjacent stations, e.g. cd and de, directly connected to the same bus section. In the chart in FIG. 4, in which the segments, a, b, . . . f representing the bus section are bent so that each bus crosses all the others, the stations are represented by dots at some crosspoints. This system has the advantage of simplicity, since each bus controller has only two input-output channels, but FIGS. 3 and 4 clearly show its disadvantages. First, when there are large numbers of stations and bus sections, the number of stations acting as relays i.e. used for routing a message in an incoming channel to an outgoing channel may be high, and the stations concerned can therefore neither transmit nor receive messages while they act as switching networks. Second, there must be as many bus sections as there are stations. Third, the failure of a bus, as a, means that to transmit the message between station ab and station af all the stations and all the intact bus sections of the systems must be seized. Fourth, the failure of a station, e.g. station ab, means that to transmit messages between stations bc and af all the intact stations and all the available buses of the system must be seized.

Figure 5:
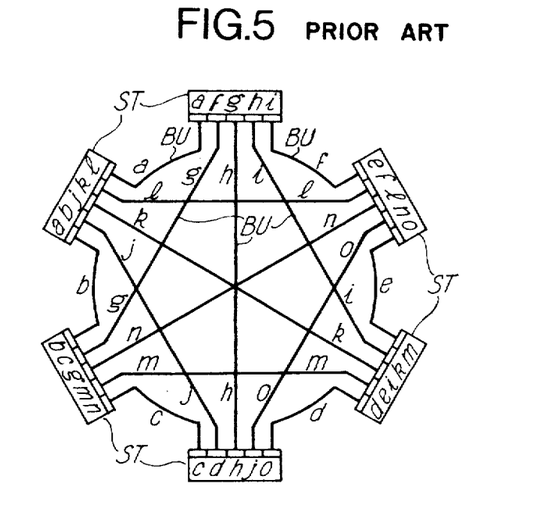
FIG. 5 is an interconnection bus chart of a system of the third prior art kind hereinbefore referred to in the first form of representation.
Figure 6:
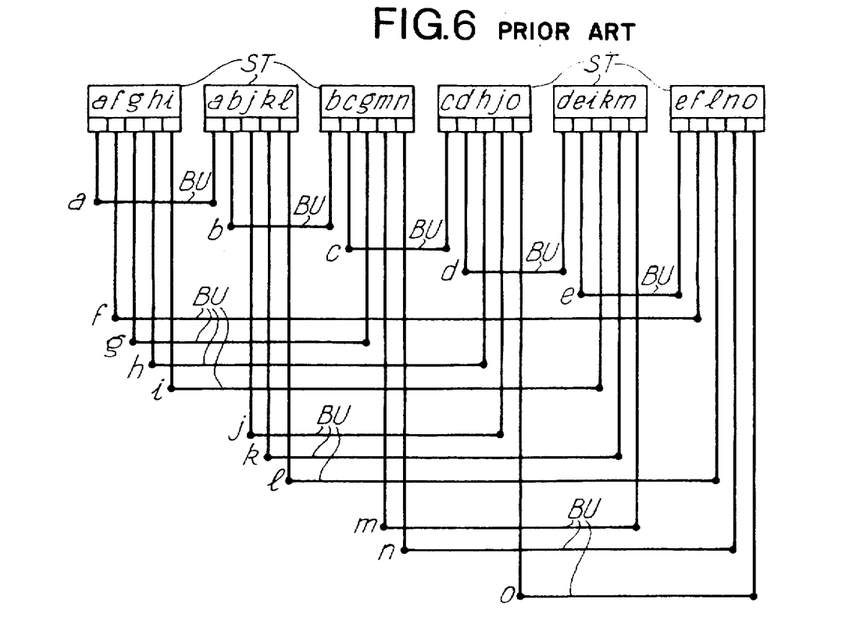
FIG. 6 is an interconnection chart of the system of FIG. 5 but in a third form of representation.

FIGS. 5 and 6, which are identical topologically, are illustrations of a final example of the prior art, namely, a prior art system of the third kind hereinbefore referred to. Each station ST is directly connected to all the other stations of the system by as many buses BU as there are stations in the system. For instance, station afghi is connected to station abjkl by bus a, to station bcgmn by bus g, to station cdhjo by bus h and so on.

A system of this kind is highly flexible in all aspects of its operation, but becomes very complex and expensive when there are a relatively large number of stations, since for a number N of stations, $P = N(N-1)/2$ buses are required and each bus controller must have at least $(N-1)$ channels.

Figure 4:
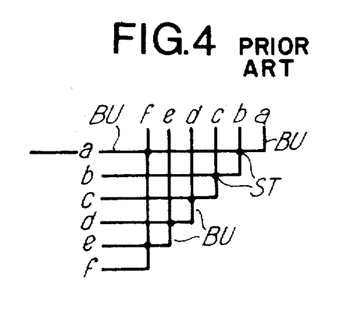
FIG. 4 is an interconnection bus chart for the system of FIG. 3 but in a second form of representation.
Figure 7:
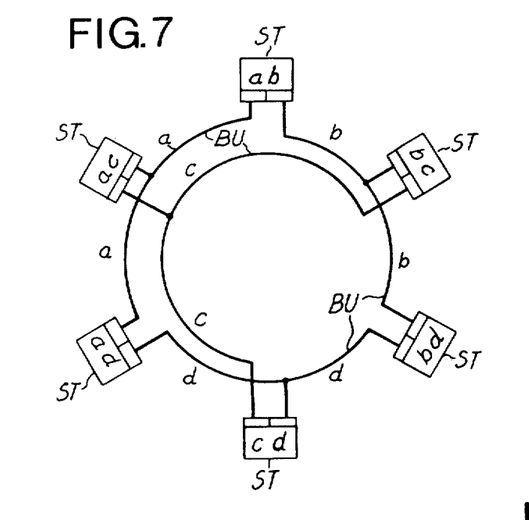
FIG. 7 is an interconnection bus chart of a system in accordance with the invention in the first form of representation.
Figure 8:
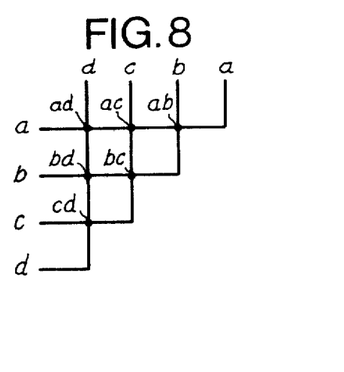
FIG. 8 is an interconnection bus chart of the system shown in FIG. 7 but in the second form of representation.
Figure 9:
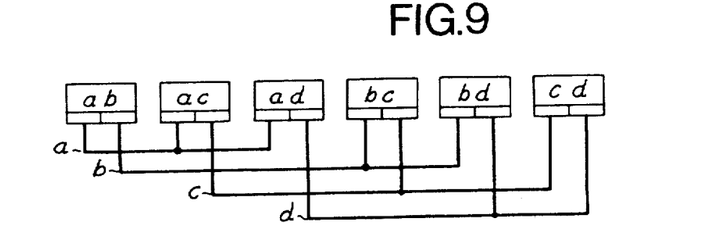
FIG. 9 is an interconnection bus chart of the system in FIGS. 7 and 8 but in the third form of representation.

Reference is now made to FIGS. 7-9, schematic illustrations of a deliberately simple embodiment of the system in accordance with the invention; as previously stated the diagram in FIG. 7 has the same form of representation as the diagrams of FIGS. 3 and 5, the diagram in FIG. 9 is the same form of representation as the diagram of FIG. 6 and the chart of FIG. 8 is in the same form of representation as the chart of FIG. 4. To facilitate comparisons, the number of stations shown in FIGS. 7-9 is the same as in FIGS. 1-6, namely just six stations, but it is of course possible with the system in accordance with the invention to interconnect many more stations.

As in FIGS. 3 and 4 (second kind of systems), each station ST is connected to only two buses BU and each station can either transmit a message or receive a message or route a message by acting as a relay station (reception via one bus of the message from a transmitting station and retransmission of the message via the other bus to an addressee station). Each bus controller therefore comprises merely two channels. However, the number of buses is such, and the connections between buses and stations are so arranged, that whatever the buses to which a first station, and a second station not interconnected by a single bus, are connected, there are always at least two other stations each connected to the first station by one bus and to the second station by another bus. Referring to the chart in FIG. 8, for instance, taking two stations at random which are not interconnected by a bus, e.g. the stations ac and bd, four stations are seen to be linked with ac via one bus and to bd by another bus, the four stations being ab, ad, bc and cd. Two stations can therefore always communicate either directly or by way of a single routing station selected from four.

Figure 10:
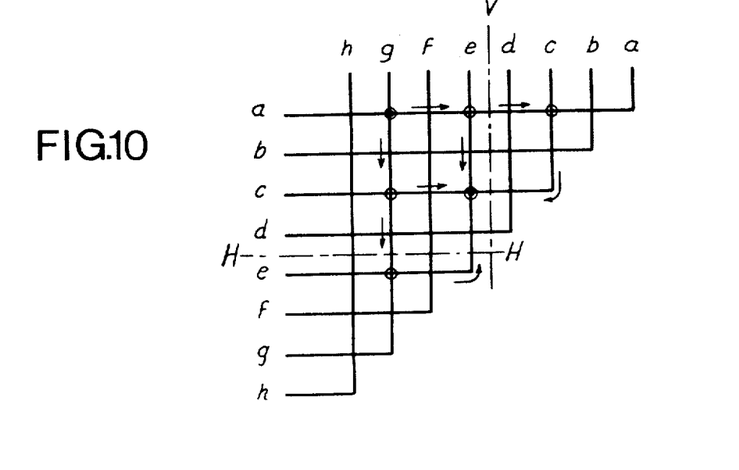
FIG. 10 is an interconnection bus chart, in the second form of representation, of another system in accordance with the invention.

These explanations become clearer by reference to the chart which is shown in FIG. 10 and which has eight buses a, b, c, . . . g, h. The corresponding system can have up to as many stations as there are nodes (which are not bus junctions) in the chart—i.e., if N is the maximum number of stations and P=8, the number of buses, $N=P(P-1)/2$. The system is then said to be complete or saturated. It is to be noticed that in the prior art system of FIG. 5, the number P' of buses depends on the number N of stations by:

$$P'=N(N-1)/2 \quad (1)$$

whereas in the invention, the number of stations depends on the number of buses by:

$$N=P(P-1)/2 \quad (2)$$

Then we have:

$$P' = \frac{(P-2)(P-1)P(P+1)}{8} \quad (3)$$

Two stations which do not have a common bus, e.g. the stations ag and ce (each represented on the chart by a circled dot) can communicate with one another by one of the following four stations each represented by a circle ae, ac, cg and eg.

Arrows indicate the routes which messages between ag and ce can take along the buses. Of course, all the stations must have provision for routing and provision for selecting one routing station of the four when all four are available. The provision for selection is described hereinafter.

Advantageously, the system is saturated in order to gain maximum advantage from the number of available buses and to have the maximum choice for indirect routeing. However, saturation is not essential, for as consideration of the chart of FIG. 10 shows, cutting out any station either deliberately or because of a failure leaves to all the stations which were able to use it as a relay for indirect routeing the possibility of using the other three stations. Failure of a bus prevents the stations connected to it from serving as relay stations but does not prevent them from direct communication with the other stations connected to the other bus nor from indirect communication by way of the four stations. Assuming that the bus g is out of operation in FIG. 10, station ag can communicate with station ce by way either of station ae or ac.

FIG. 10 also helps to show an example of a system in accordance with the invention, the system being incomplete—i.e., unsaturated. In this example, the stations on the right of the line V and below the line H are omitted. The addresses of the remaining stations are determined by the intersections of a square matrix in which the rows represent the addresses of the buses a, b, c, d and in which the columns represent the addresses of the buses e, f, g and h. In this event, the bus network comprises two bus subgroups not sharing a common bus, and the two buses to which each station is connected are associated one each with the two subgroups. Each station of this unsaturated system can communicate indirectly by way of two relay stations with any other station; for instance, stations ag and ce can communicate with one another by way of station ae or of station cg. The matrix need not necessarily be square—i.e., the two bus subgroups do not each have to comprise the same number of buses.

The parameters of the multiprocessor system assumed to be saturated are functions of the number of buses P.

Each station is connected to 2 buses and the pair of buses is different for each station.

The number of stations $N=C_P^2=P(P-1)/2$

Each station is directly connected to $\alpha = 2(P-2)$ other stations

Each station is indirectly connected to $\beta = (P-2)(P-3)/2$ other stations

Each bus is connected to $\gamma = (P-1)$ stations

There are always four relay-stations for each station to be indirectly connected to another station.

EXAMPLE No. 1

P=4
$N=C_4^2=6$
$\alpha=4$
$\beta=1$
$\gamma=3$

EXAMPLE No. 2

P=5
$N=C_5^2=10$
$\alpha=6$
$\beta=3$
$\gamma=4$

EXAMPLE No. 3

P=16

$N = C_{16}^2 = 120$ $\alpha = 28$ $\beta = 91$ $\gamma = 15$

Figure 15:
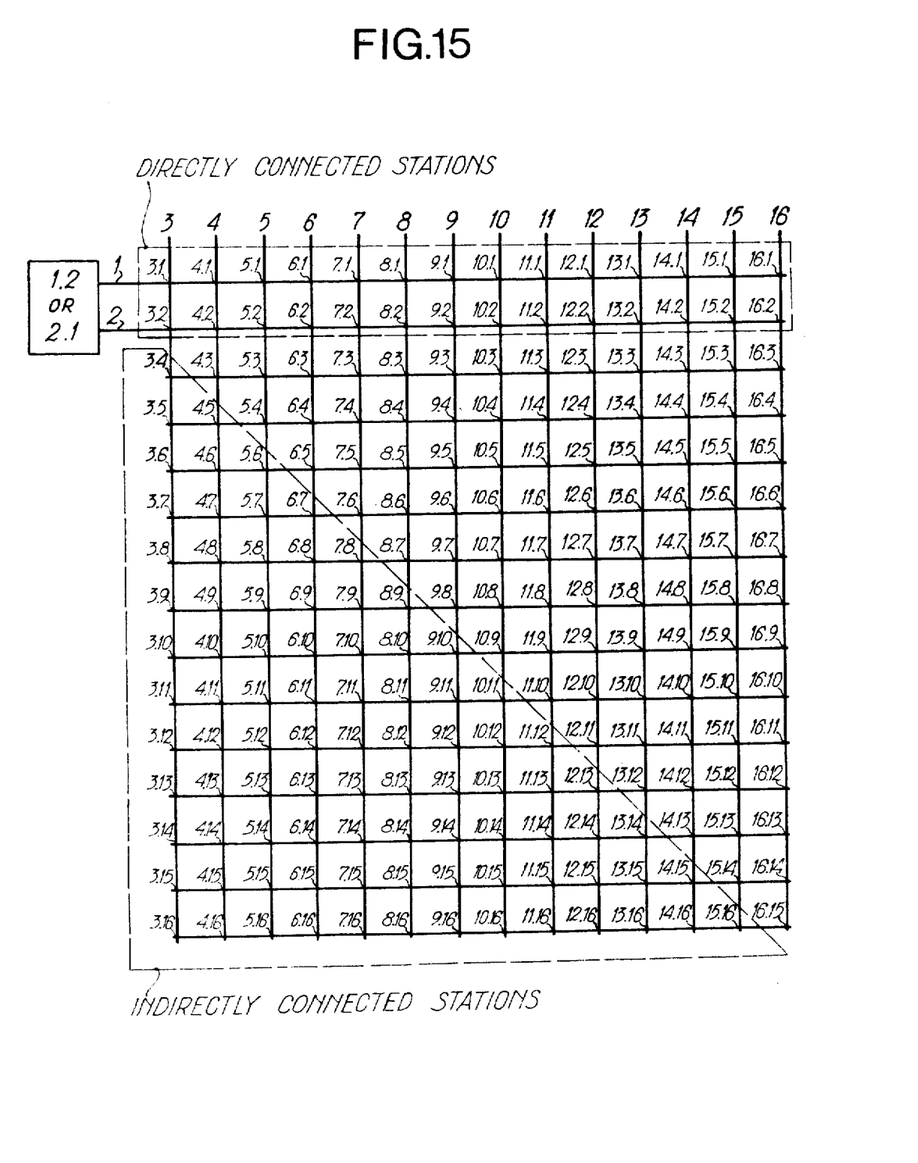
FIG. 15 is a table for the calculation of the numbers of directly connected stations and indirectly connected stations in a multiprocessor system having sixteen buses.

For the calculation of the number $\beta$ of indirectly connected stations per station, let us refer to FIG. 15 relative to example No. 3.

Station 1.2 (or 2.1) is directly connected to the two buses 1 and 2 and 14 other stations are directly connected to each of these two buses. Thus $\alpha = 28$. For example, stations 3.1 to 16.1 are directly connected to bus 1. Each of these stations is directly connected to 14 other stations. For example, station 3.1 is directly connected to station 3.2 to 3.16. But station 3.2 is already reckoned among the stations directly connected to station 1.2. As station 1.2 is the same as station 2.1, the number $\beta$ is finally:

$$(P - 2)(P - 3)/2 = \frac{14 \times 13}{2} = 91$$

Figure 11:
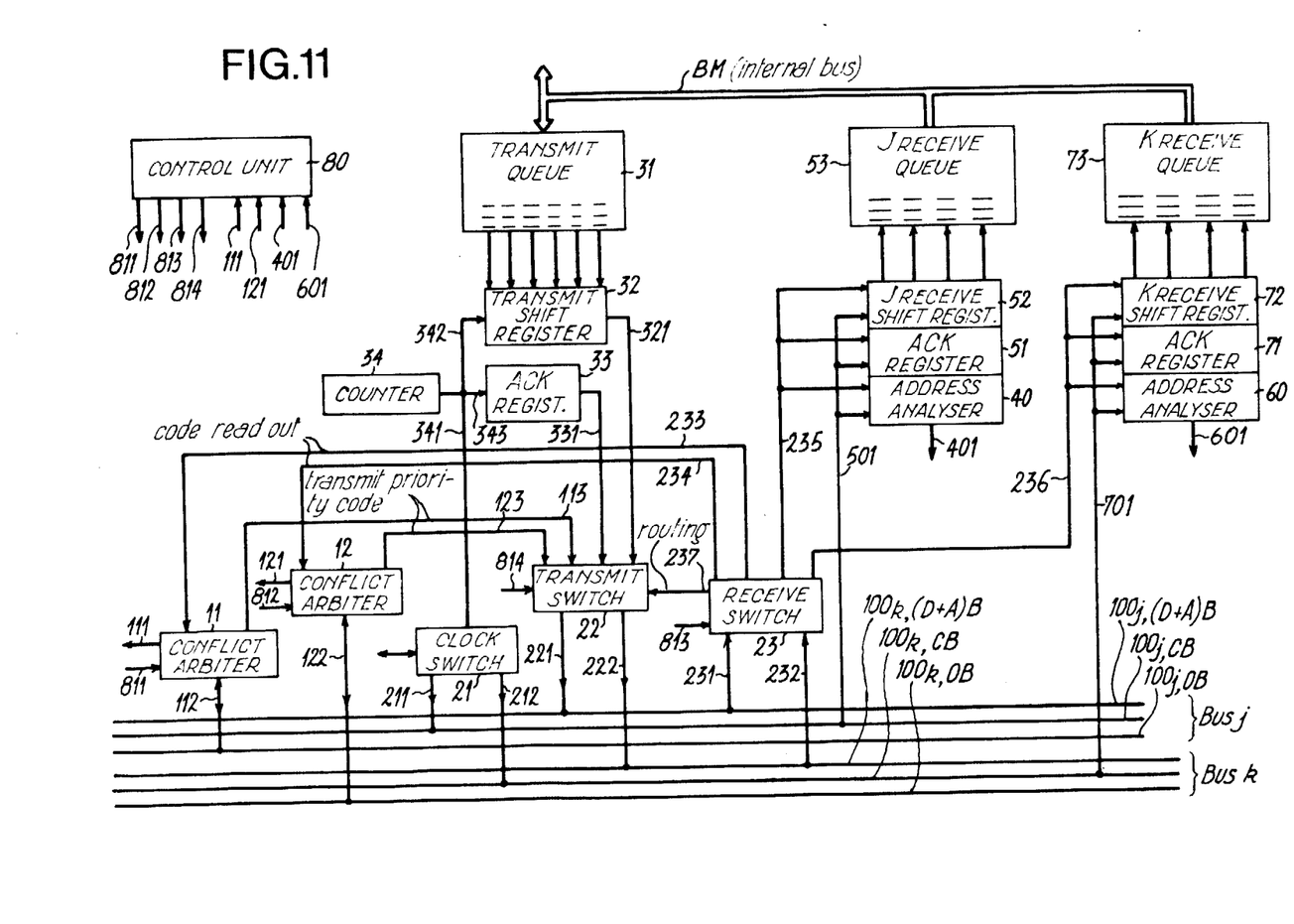
FIG. 11 is a block diagram of a processor station in a system in accordance with the invention.

Refer now to FIG. 11, it an illustration of an embodiment of a bus controller for a station of the system in accordance with the invention. The bus controller serves as a junction between, on the one hand, the two buses—the buses j and k in this case—of the bus network of the system and, on the other hand, via the internal bus BM, the processor (not shown) of the station. It comprises:

Two prior art conflict arbiter circuits 11, 12;

A clock switch 21, a transmit switch 22 and a receive switch 23;

A transmit queue circuit 31 (FIFO), a transmit shift register 32 and an acknowledgment register 33;

A pulse counter 34;

An address analyser 40, an acknowledgement register 51, a receive register 52 and a receive queue circuit 53 associated with bus j;

An address analyser 60, an acknowledgement register 71, a receive register 72 and a receive queue circuit 73 associated with bus k; and A control unit 80.

For the sake of simplicity, the input and/or output interfaces between the conflict arbiters and the switches on the one hand, and the buses on the other hand, are not shown.

Before any further description of the station bus controller shown in FIG. 11 is given, reference is briefly made to FIGS. 12 13A, 13B and 13C. If the calling station, as jk, shares a common bus with the addressee station, e.g. jp or jq the calling station will of course choose this common bus, e.g. the bus j, for a direct transmission. In the absence of a common bus, for instance, if the addressee station is pq, the transmission must be indirect.

Figure 12:
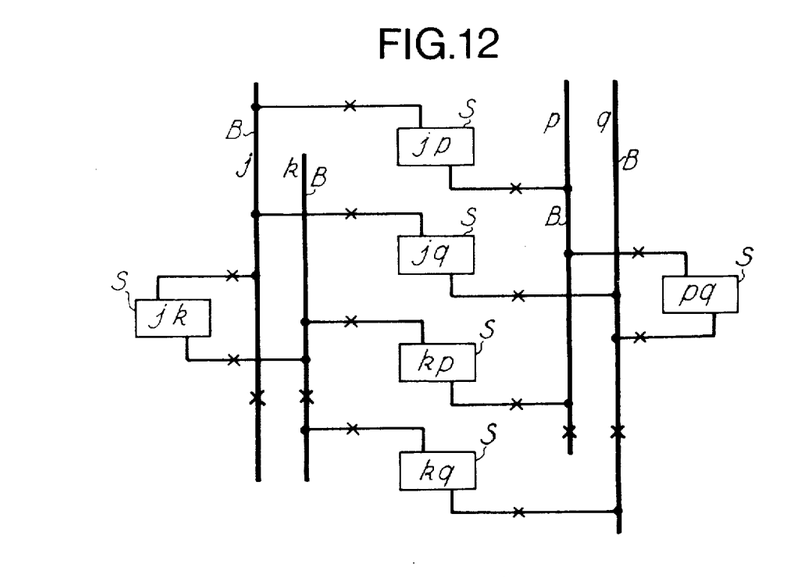
FIG. 12 is a diagram referring to the system shown in FIG. 11 to describe the possibilities of routing a message between two stations having no common bus.

FIG. 12 is a diagram of the buses and relay stations used for trunking between a station jk and a station pq in a complete system. The stations whose address is given within the rectangles representing them have a reference S and the buses have a reference B.

The four possible routes are of course the following:
station jk, bus j, station jp, bus p, station pq;
station jk, bus j, station jq, bus q, station pq;
station jk, bus k, station kp, bus p, station pq;
station jk, bus k, station kq, bus q, station pq.

Since only one relay station and two buses are operative, the other stations, available as relays, and the other buses must be cleared so they may deal with other duties if necessary and to prevent conflicts.

Figures 13A, 13B:
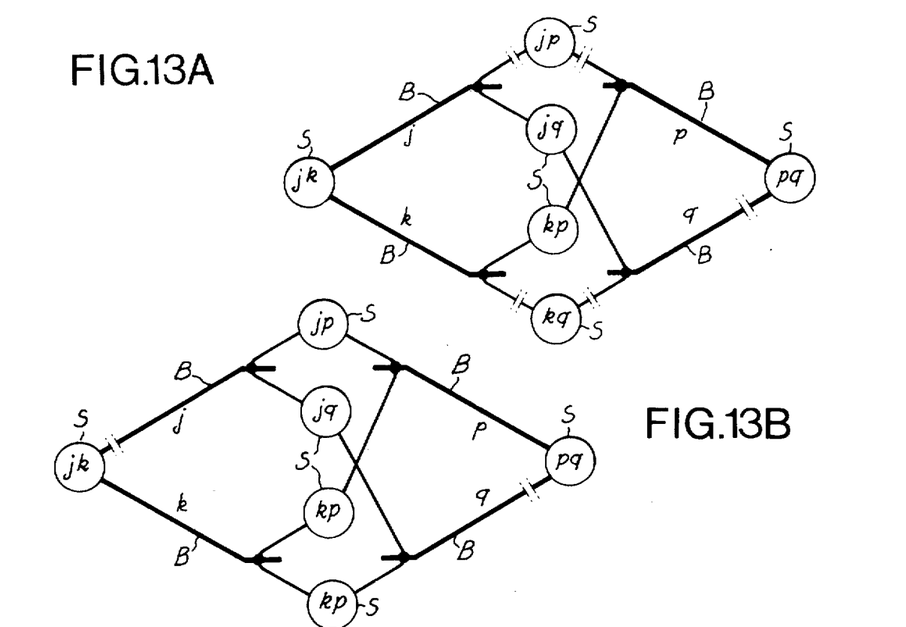
FIGS. 13A, 13B and 13C are collections of charts illustrating possible routes between two stations having no common bus.

The diagrams in FIGS. 13A and 13B show two possible solutions. The stations S are represented by circles with the corresponding addresses inside them and the buses B are represented by heavy lines. Station connection and disconnection operations are in fact performed through the agency of the bus controllers in the stations. It will also be assumed that all the buses and stations concerned are free when trunking beings.

A description is given hereinafter of the means (address analyzers) in the bus controllers enabling the system stations to "identify" one another as addressees or as relay stations, but in any case, the stations operate as follows, bearing in mind that a station address consists of the sequence in any order of two words representing the addresses of the buses to which the station is connected. The criteria are very simple. If the address received by a station via one of its buses consists of the two address words of its two buses, the station identifies itself as the call addressee. If the address received by a station via one of its buses contains only the address word of the other bus, the station identifies itself as a relay. If the address received by a station via one of its buses does not contain the address word of the other bus, the station is not concerned in the call.

In FIG. 13A, station jk, which wants to call station pq, transmits the address pq over the two buses j, k. The two stations kq, jq receive the address pq which they endeavour to retransmit over the bus q. However, the conflict arbiters of the bus controllers of stations kq and jq are wired to give jq priority; therefore kq disconnects, as indicated by a double break line in each coupling connection of kq. Similarly, in the station pair kp and jp receiving the address pq and endeavouring to retransmit it by the bus p, kp has priority and jp disconnects.

The address pq reaches station pq via the two buses p, q. Station pq identifies itself as the addressee station and selects e.g. the bus p (double break line in bus q) to transmit an acknowledgment of receipt of the message to station jk. The acknowledgment of receipt must pass through station kp, in which the transmit and receive switches of the bus controller connect with one another to provide a physical connection between the two buses k and p. The station jk can then transmit to the station pq solely by way of the switches of the station kp (the circle of which is accordingly bounded by a bold line) and station pq terminates the traffic by transmitting a second acknowledgment of receipt over the same channels p and k.

With regard to the buses not busied by the traffic, the bus j was released by the station jk upon the arrival of the first acknowledgment of receipt and the bus q is released by the station jq which, upon discovering that the bus j has been cleared, is thereby formed that it has not been selected as relay by station pq.

When station jk receives a second acknowledgment of receipt, it releases the bus k, whereafter the station kp, upon discovering its clearance, clears the bus p.

For the duration of the traffic, all the system stations connected to the buses, j, k, p, q stood by for clearance thereof. Once they are clear, the bus controllers of these stations are permitted to operate again—i.e., such stations return to the operational state.

The diagram in FIG. 13B shows another possible solution which is described briefly since its operation can readily be understood from the foregoing explanations. The transmitting station jk automatically selects the bus k to transmit the address pq. More accurately, the bus k has priority over the bus j, the latter being used only if k is already busy. The address pq is routed via the stations kp and kq, but the addressee station pq, which receives the address via the two buses p and q, gives the priority to the bus p, so that only the station kp is selected as relay (circle in bold line).

Figure 13C:
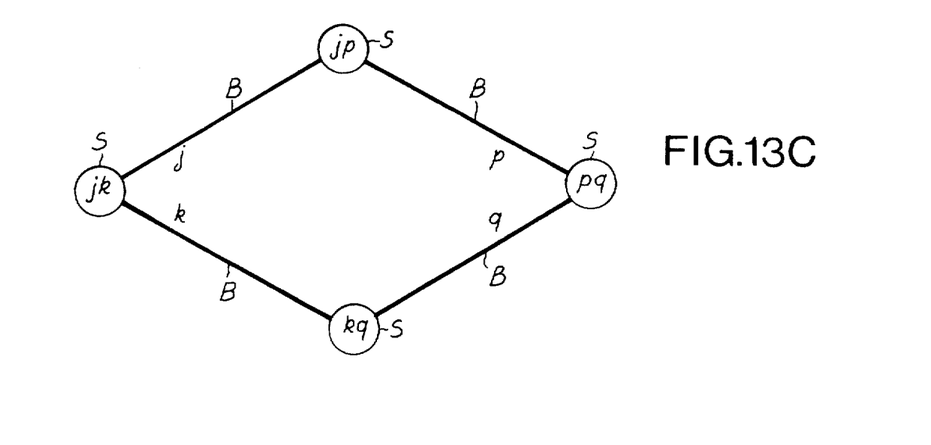

The diagram of FIG. 13C relates to the case of an incomplete system in which the only relay stations possible between the stations jk and pq are the stations jp and kq. Route selection involves only a single step, instead of the two steps in the complete system just described. The route can be selected either by the transmitting station jk (priority given to one of the buses j or k) or by the addressee station pq (priority given to the bus p or to the bus q).

Conflict arbiters 11, 12 of the bus controller, FIG. 11, respectively receive control signals from control unit 80 via lines 811, 812 and transmit back acknowledgment of receipt via lines 111, 121 respectively, arbiters circuits 11, 12 are wired for any of the forms of route searching hereinbefore described.

Route searching does not arise in the case of direct communication (of an address or of information or of an acknowledgment of receipt). With the station listening out, the conflict arbiters 11, 12 continuously test, via lines 112, 122, the state of the occupation circuits $100_{j,OB}$ and $100_{k,OB}$ of the corresponding buses, while the receive switch 23 (connected to the two bus circuits $100_{j,(D+A)B}$ and $100_{k,(D+A)B}$ by the lines 231, 232) retransmits the codes read on the bus circuits to the conflict arbiters 11, 12 via the lines 233, 234. Each conflict arbiter prepares a decision-making code which is transmitted via the transmit switch 22 to the buses $100_{j,(D+A)B}$ and $100_{k,(D+A)B}$ over the lines 113, 123. The conflict arbiters 11, 12 decide whether priority should be given to the station when it is competing with other stations which are candidates for one of the two buses to which it is connected.

The address and information messages prepared by the processor (not shown) go via the internal bus BM to the transmit queue 31 and are introduced therein as parallel words which are retransmitted from the queue in chronological order of arrival to the transmit shift register 32. Register 32 feds the address and information messages as series words to transmit switch 22 via line 321. Acknowledgment of receipt does not pass through the queue 31 and is transmitted by an acknowledgment register 33 to switch 22 over line 331. Using for instance, the processor timer, a counter 34 prepares timing signals which are transmitted by transmit shift register 32 via line 342, to acknowledgment register 33 via line 343 and to clock signal switch 21 via line 341. Clock switch 21 is connected to the bus circuits $100_{j,CB}$ and $100_{k,CB}$ by lines 211, 212.

Upon receipt of an address message routed via one of the two buses to which it is connected, the bus controller has to decide whether its station is required to act as an addressee station or as a relay station or not to act at all. As a rule, the receive switch 23 sends messages coming over the bus j to analyzer 40 and to registers 51, 52 by way of lines 235, passing on messages which have come over the bus k to analyzer 60 and registers 71, 72 via lines 236.

The addresses from the two buses are analyzed by analyzers 40, 60. Clock pulses transmitted by circuit $100_{j,CB}$ of the bus j are transmitted via line 501 to analyzer 40 and to registers 51, 52 and clock pulses transmitted via circuit $100_{k,CB}$ of the bus k are transmitted via line 701 to analyzer 60 and to registers 71, 72.

Figure 14:
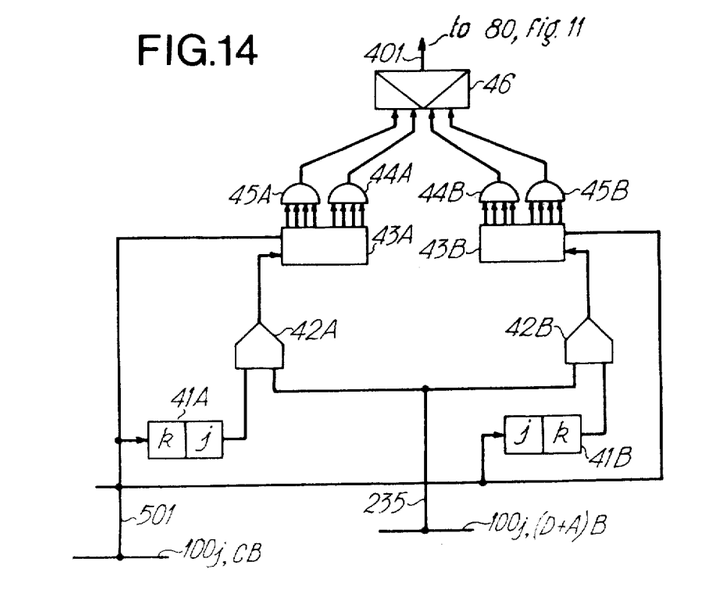
FIG. 14 is a block diagram of an address identification circuit used in the station in FIG. 11.

Referring now to FIG. 14, which is a block diagram of one of the analyzers, e.g. the analyzer 40 (the other analyzer being identical), the address of any station consists of the grouping in any order to the addresses of the two buses to which the station is connected. The buses considered in FIGS. 11 and 14 are the bus j and the bus k and so the station address can be written as jk or kj.

Assuming that each bus address is expressed by 4 bits, the number of addressable buses is, for the sake of explanation, 16 and the complete or saturated system is that of Example No. 3 which comprises 120 stations. The analyzer shown in FIG. 14 comprises:

A first store register 41A storing the 8-bit word jk and timed by the clock pulses received via line 501 connected to the circuit $100_{j,CB}$ of the corresponding bus—the bus j in this case;

A second store register 41B storing the 8-bit word kj also timed by the same clock signal;

Two comparators 412A, 42B, one input of comparator 42A being connected to the output of register 41A, one input of comparator 42B being connected to the output of register 41B and the other input of the two comparators being connected to the bus circuit $100_{j,(D+A)B}$ by lines 235;

Two series-parallel 8-bit shift registers 43A, 43B, the register 43A being timed by the clock signal (circuit 501) and receiving the output bits of comparator 42A, while the register 43B is timed by the same clock signal and receives the output bits of the comparator 42B;

An AND-gate 44A having four inputs continuously receiving the respective four oldest bits in the register 43A;

An AND-gate 45A having four inputs continuously receiving the four respective most recent bits stored in the register 43A;

An AND-gate 44B and an AND-gate 45B whose connections to the register 43B are the same as the connections of the AND-gates 44A, 45A to the register 43A, and A decoding circuit 46 having four inputs connected one each to the four outputs of the AND-gates 44A, 45A, 44B, 45B, the decoder output being connected to control unit 80 by line 401 to transmit a signal, e.g. a parallel 2-bit word, denoting the duty for that station—i.e., reception or relaying or zero duty.

The operation of the address analyzer is now described. Comparator 42A compares the bits of the series word transmitted by the register 41A (address jk) with the bits of the address delivered by the bus circuit $100_{j,(D+A)B}$. If the two addresses are identical, the comparator 42A delivers an 8-bit sequence having the logic value 1. The comparator 42B performs the same comparison duty in respect of the contents of the register 41B (address kj).

The decoder 46 receives from AND-gate 44A a 1-bit only if the first 4-bit word contained in the register 43A is "1111"—i.e., if the first address word transmitted via the bus circuit $100_{j,(D+A)B}$ is j. Decoder 46 receives from AND-gate 45A a 1-bit only if the second 4-bit word contained in the register 43A is "1111"—i.e., if the second address word transmitted via the bus circuit $100_{j,(D+A)B}$ is k. Consequently, if the parallel 2-bit word transmitted by the outputs of gates 44A and 45A is "11", the address transmitted via the bus circuit is jk, and the station concerned is the addressee.

Similarly, if the parallel 2-bit word transmitted by the outputs of gates 44B and 45B is "11", the address transmitted via the bus circuit $100_{j,(D+A)B}$ is kj and the station concerned is again the addressee station.

Returning to FIG. 12, a station receiving a 2-word address can act as a relay station if such address has just one word which is the same as that station's own address. It is therefore possible to prepare the following Table in which R denotes that the station must act as relay, D that it is the addressee and N that it is neither the relay station nor the addressee. Hereinafter, in each analyzer, the bit of gate 44A is called a, the bit of gate 45A is called b, the bit of gate 44B is called c and the bit of gate 45B is called d.

| Analyser 40: bus j | | | | | Analyser 60: bus k | | | |
|---|---|---|---|---|---|---|---|---|
| Bits | | | | Station duty | Bits | | | Station duty |
| a | b | c | d | | a | b | c | c |
| 0 | 0 | 0 | 0 | N | 0 | 0 | 0 | 0 | N |
| 1 | 1 | 0 | 0 | D | 0 | 0 | 1 | 1 | D |
| 0 | 0 | 0 | 1 | N | 1 | 0 | 0 | 0 | R |
| 0 | 1 | 0 | 0 | R | 0 | 0 | 1 | 0 | N |

Bit combinations other than those listed in the Table are invalid and can appear only because of malfunctioning. What makes it possible to use address analyzer circuits as simple as those shown in FIG. 14 in the stations of the system is the the fact that each station is connected to two buses and the form in which station addresses are established (grouping of the two addresses of the buses). It is therefore unnecessary for each station to be provided with its own correspondence Table for indicating to each addressee station that such station derives to reach the or each possible relay station. Similarly, there is no need for each station to store the addresses of the other stations which it can place in communication with one another in its capacity as a relaying station. A station decides, through the agency of analyzers of very simple design, whether it is required to act as addressee or relay only at the time of receipt of a call.

Furthermore, the procedures for creating and analyzing addresses used in the system in accordance with the invention obviate the routeing of a message by way of more than one relaying station.

The diagram of the bus controller shown in FIG. 11 is referred to for the last time to describe how it operates when the address analyzers have decided that the station is the addressee station or is required to act as a relay.

When the analyzer 40 informs unit 80 by way of line 401 (see FIG. 14) that the station is the addressee for a call transmitted via the bus j, the unit 80 instructs the receive switch 23 to transmit the information bits transmitted via the bus circuit $100_{j,(D+A)B}$ of the bus j (line 231) to the registers 51, 52. The register 51 is used to process acknowledgments of receipt which are repeated to unit 80 via a circuit which is not shown. Register 52 is a series-parallel register which retransmits messages to the receive queue 53 in the form of parallel words.

If the call has come over the bus k, the information items in it are processed in the same way by way of circuit 701, registers 71, 72 and receive queue 73. The use of two identical sets of registers and queues each supplied by one of the two buses enables the station to receive simultaneously, as addressee, messages carried by both the buses and to queue one of the messages, the other being routed to the processor via the internal bus BM.

When the analyzer 40 informs unit 80 (via line 401) that station is required to act as a relay (this is the case when the station address transmitted via the bus j contains the address word of the bus k but not the address word of the bus j), it instructs the receive switch 23 via line 813 to retransmit the address-containing message of the bus j to the transmit switch 22 by way of the routing line 237. Unit 80 also responds to analyzer 40 by instructing the transmit switch 22 via line 814 to retransmit the message to the circuit $100_{k,(D+A)B}$ of bus k by way of line 222. A message is routed from bus k to bus j in the same way if the address transmitted via bus k contains the address word of bus j but not the address word of bus k. To complete this description, the bus controller shown in FIG. 11 comprises:

Elements for performing clearly determined routing and logic processing duties which can be embodied by wiring, namely the conflict arbiters 11, 12, the switches 21-23 and the analyzers 40, 60; and Registers, queues and a control unit for implementing programmable operations. These elements and the control unit can of course be combined in a logical and digital unit arranged around a microprocessor.

What we claim is:

1. A multiprocessor system comprising:
   a plurality of P buses having addresses from 1 to P, P being an integer at least equal to 4;
   a plurality of P (P−1)/2 stations, each including a processor and connected to a pair of connecting buses, the bus pair being different for each processor station and each bus being connected to (P−1) processor stations, means for connecting each processor station directly by its connecting bus pair to 2 (P−2) other processor stations and for connecting each processor station indirectly to (P−2) (P−3)/2 other processor stations through one single processor station acting as a relay station;
   the buses being respectively assigned single address words;
   each processor station being assigned an address formed by the grouping in any order the single address words of the two buses forming the pair of connecting buses for the particular processor station;
   means in a calling processor station for transmitting to an addressee processor station data and the two address words assigned to said address processor station;
   means in a processor station for respectively deriving first and second responses in response to receipt by the processor of the two address words being the address of (a) said processor station formed by the same two address words, and (b) the address of said processor station and the two address words having only a single address word in common,
   said processor station including means respectively responsive to the first and second responses for activating the processor station to function as the addressee processor station and as a relay processor station, the processor station, when functioning as a relay station, including means for connecting together the two buses of the pair of connecting buses thereof.

2. The multiprocessor system of claim 1 wherein the response deriving means responsive to the two transmitted address words comprises a first store containing a grouping in a given order of the two single address words of the two buses to which said stations are connected, a second store containing a grouping in the opposite order of the two single address words of the two buses to which said stations are connected, means for comparing the two transmitted address words with the addresses contained in said first and second stores and for generating the first response in response to said transmitted two address words being identical to one of the addresses contained in said first and second stores and the second response in response to said transmitted two address words containing only one address word identical to the address of only one of the two buses to which said processor station is connected.

3. A station for a multiprocessor system including a plurality of P buses having addresses from 1 to P, P being an integer at least equal to 4, and a plurality of P (P−1)/2 stations connected to a pair of connecting buses, the bus pair being different for each processor station and each bus being connected to (P−1) processor stations, the buses being respectively assigned single address words, each processor station being assigned an address formed by the grouping in any order the single address words of the two buses forming the pair of connecting buses for the particular processor station; the station comprising:
   means for connecting it directly by its connecting bus pair to 2 (P−2) other processor stations and for connecting it indirectly to (P−2) (P−3)/2 other processor stations through one single processor station acting as a relay station;
   means for activating the processor station into a calling mode for transmitting (a) data to an addressee processor station and (b) the two address words assigned to said addressee processor station;
   means for activating the processor station into a receiving mode; in the receiving mode, the processor station including means for respectively deriving first and second responses in response to two transmitted address words being the address of (a) said processor station formed by the same two address words, and (b) the address of said processor station and the two address words having only a single address word in common,
   said processor station including means respectively responsive to the first and second responses for activating the processor station to function as the addressee processor station and as a relay processor station, the processor station, when functioning as a relay station, including means for connecting together the two buses of the pair of connecting buses thereof.

4. The station of claim 3 wherein the response deriving means responsive to the two transmitted address words comprises a first store containing a grouping in a given order of the two single address words of the two buses to which said stations are connected, a second store containing a grouping in the opposite order of the two single address words of the two buses to which said stations are connected, means for comparing the two transmitted address words with the addresses contained in said first and second stores and for generating the first response in response to said transmitted two address words being identical to one of the addresses contained in said first and second stores and the second response in response to said transmitted two address words containing only one address word identical to the address of only one of the two buses to which said station is connected.

5. A multiprocessor system comprising:
   P buses, each respectively having single address words 1. . . P, where P is at least four,
   P (P−1)/2 stations, each connected directly to only a pair of said buses, a different pair of said buses being directly connected to each of said stations,
   the buses and stations being interconnected so that each of said stations is: (a) directly connected by the pair of buses directly connected to it to 2 (P−2) of said stations, and (b) indirectly connected to (P−2) (P−3)/2 of said stations via only one of said stations functioning as a relay station,
   each of the stations respectively having an address formed by grouping in any order the single address words of the two buses directly connected to the station,
   the number of buses being such and the connections between the buses and stations being arranged so that: no two stations are directly connected to the same pair of buses, first and second of said stations are directly connected to four different ones of said buses, and said first and second stations are indirectly connected to each other by at least two other of said stations and the buses connected to said first and second stations as well as to the two other stations;
   each station including:
   (a) means for transmitting to an addressee station data and the two address words of the addressee station;
   (b) means responsive to two address words transmitted from another of said stations and received by the particular station on one bus thereof for respectively deriving first and second responses in response to (1) the two transmitted address words being the same as both of the address words assigned to the particular station and (2) only one of the two transmitted address words being the same as one of the address words assigned to the particular station,
   means responsive to the first response for receiving the transmitted data, and
   means responsive to the second response for supplying the transmitted data and the two transmitted address words to the other bus of the particular station.

6. The multiprocessor system of claim 5 wherein the response deriving means responsive to the two transmitted address words comprises a first store containing a grouping in a given order of the two single address words of the two buses to which said stations are connected, a second store containing a grouping in the opposite order of the two single address words of the two buses to which said stations are connected, means for comparing the two transmitted address words with the address contained in said first and second stores and for generating the first response in response to said transmitted two address words being identical to one of the addresses contained in said first and second stores and the second response in response to said transmitted two address words containing one address word identical to the address of only one of the two buses to which said processor station is connected.

* * * * *

UNITED STATES PATENT AND TRADEMARK OFFICE
CERTIFICATE OF CORRECTION

PATENT NO. : 4,434,463
DATED : February 28, 1984
INVENTOR(S) : Jean-Paul QUINQUIS & Michael A. DEVAULT It is certified that error appears in the above-identified patent and that said Letters Patent is hereby corrected as shown below:

On the title page,
Item [54] Title should read:

--MULTIPROCESSOR TOPOLOGY WITH PLURAL BUSES FOR DIRECTLY AND INDIRECTLY COUPLING ADDRESSES AND RELAY STATIONS--

Signed and Sealed this

Fifteenth Day of May 1984

[SEAL]

Attest:

GERALD J. MOSSINGHOFF

Attesting Officer     Commissioner of Patents and Trademarks